(No Model.)
J. M. CRAWFORD.
EYEGLASSES AND SPECTACLES.
No. 266,436. Patented Oct. 24, 1882.
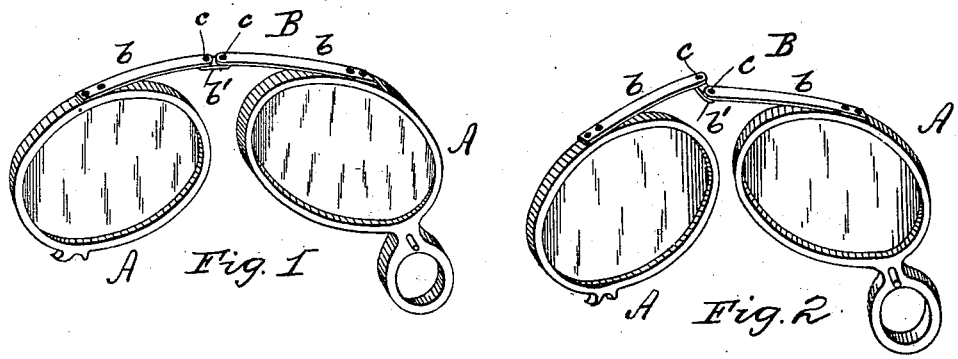
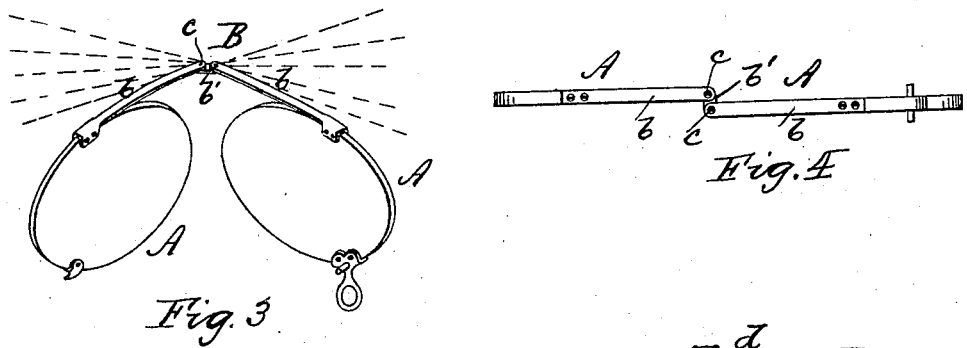
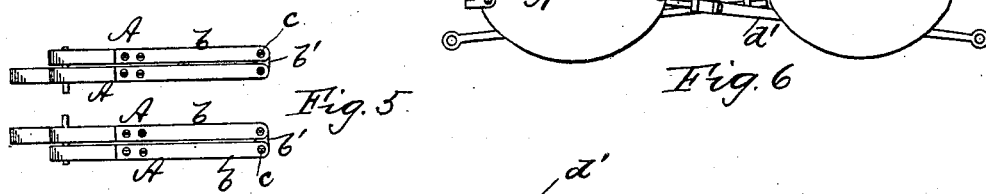
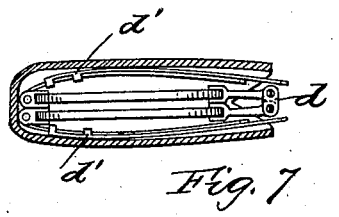
WITNESSES:
S. J. Van Stavoren
S. L. Jones
INVENTOR,
John M. Crawford
By Connolly Bros.,
ATTORNEYS
N. PETERS. Photo-Lithographer. Washington, D. C.

UNITED STATES PATENT OFFICE.

JOHN M. CRAWFORD, OF PHILADELPHIA, PENNSYLVANIA.

EYEGLASSES AND SPECTACLES.

SPECIFICATION forming part of Letters Patent No. 266,436, dated October 24, 1882.

Application filed February 13, 1882. (No model.)

*To all whom it may concern:*

Be it known that I, JOHN M. CRAWFORD, a citizen of the United States, residing at Philadelphia, in the county of Philadelphia and State of Pennsylvania, have invented certain new and useful Improvements in Eyeglasses and Spectacles; and I do hereby declare the following to be a full, clear, and exact description of the invention, reference being had to the accompanying drawings, which form part of this specification, in which—

Figures 1, 2, and 3 are perspectives of my invention. Fig. 4 is a plan of the same in one of its many positions. Fig. 5 shows plans illustrating how the eyeglasses may be folded. Fig. 6 is an elevation of a pair of spectacles embodying my invention; and Fig. 7 is a section of a case, showing the spectacles folded within the same.

My invention has for its object to provide the bridge or bow-spring of eyeglasses and spectacles with a joint of such construction that all may be made of metal of the usual width, and which will permit the glasses to be folded together on either side.

A further object of my invention is to provide a jointed bridge or bow-spring for eyeglasses and spectacles which will permit the lenses to be relatively adjusted to bring one nearer than the other to the eye of the user, the joint in the bridge being formed by inserting a piece of metal of the same width as the body of the bow-spring.

My improvements consist in forming the bridge or bow-spring of eyeglasses or spectacles with a joint-piece of spring-steel of the same width as the body of the bow-spring, the said joint-piece being adapted and designed to allow the glasses to be folded together on either side and to adjust their relative distance from the eyes of the wearer.

Referring to the accompanying drawings, A A represent the lenses united by a bow-spring, B. Said spring is made in two pieces, *b b*, united by a third short piece or link, *b'*, of the same material and width as themselves. The link *b'* is pivotally secured to the pieces *b b* by rivets *c c*, so as to form a double joint which will permit the lenses to be folded in either direction or on either side upon one another, so as to occupy the position shown in figure 5.

By means of the construction described the lenses may be adjusted to be parallel and in the same line, both thus being equidistant from the eyes of the wearer, as shown in Fig. 1; or they may be adjusted to remain parallel, but not aligned, as in Fig. 4, one lens being thus brought nearer to the eye than the other, which is an advantage in case one eye of a wearer is of greater strength than or has a different length of focus from the other eye. By this means also the distance between the lenses may be adjusted, as it is obvious that when fixed as in Figs. 2 and 4 the edges of the lenses are closer together than when arranged as shown in Fig. 1. Said joint will also permit the lenses to be adjusted at any desired angle or inclination with respect to each other, as shown in Fig. 3.

By making the joint a double one, as described, the entire bow, including the joint, may be made of one width, being the same width as usually employed. Ordinary watch-spring steel may accordingly be employed as the materials of the bow and joint, whereas if the joint were a single one, as has been heretofore proposed, the bow-spring would have to be specially prepared with lateral lugs at the jointed ends for the reception of the rivet.

Usually the lenses are to be brought together when not in use, or it is desired to put the eyeglasses in their case, by folding them upon one another in either direction. If desired, however, they may be brought together by bending the spring in the customary manner of unjointed eyeglasses.

A special advantage pertaining to the double joint is that it permits the lenses to be folded on each other in either direction, whereas a single joint will permit such folding in only one way, and if a wearer attempt to hold them in the opposite way the spring is apt to be broken.

Fig. 6 shows my improvements applied to spectacles, the bridge having a double joint, *d*. If the latter have jointed or sliding sides *d'*, the spectacles may be folded into a very small compass, as shown in Fig. 7.

What I claim as my invention is—

1. An eyeglass bow-spring having a double joint, consisting of the pivoted piece *b'*, said joint-piece being of spring-steel of the same width as the body of the bow-spring, substantially as shown and described.

2. In combination with the lenses A A of eyeglasses or spectacles, a bow-spring or bridge, B, composed of two pieces, $b\ b$, united by a link, $b'$, and two pivots, $c\ c$, the pieces $b\ b\ b'$ being of the same width, the joint of the nose-piece being adapted to allow the glasses to be folded together on either side, substantially as shown and described.

3. In eyeglasses and spectacles, a folding joint in the bow-spring or bridge adapted to adjust the distance between the lenses and their relative distance from the eyes, substantially as set forth.

In testimony that I claim the foregoing I have hereunto set my hand this 9th day of February, 1882.

JOHN M. CRAWFORD.

Witnesses:
ANDREW ZANE, Jr.,
M. D. CONNOLLY.